Aug. 23, 1932.  J. ZETSCHE ET AL  1,873,171

ELECTRIC MOTOR

Filed June 27, 1929

Inventors
JONNI ZETSCHE,
NICOLAUS PETERSEN,
JAMES SINCLAIR-ROSS,

By Toulmin & Toulmin
Attorneys

UNITED STATES PATENT OFFICE

JONNI ZETSCHE AND NICOLAUS PETERSEN, OF HAMBURG, GERMANY, AND JAMES SINCLAIR-ROSS, OF LONDON, ENGLAND; SAID PETERSEN ASSIGNOR TO SAID ZETSCHE AND SAID SINCLAIR-ROSS

ELECTRIC MOTOR

Application filed June 27, 1929, Serial No. 373,988, and in Great Britain February 25, 1929.

This invention relates to electric motors adapted to be operated either by alternating or direct current, the rotors and stators of which consist of separate coils.

The object of the invention is to provide an improved electric motor of the above type adapted more particularly for driving small machinery, such for example as gramophones.

The principal difficulty met with in the construction of all universal slow speed motors is the problem of housing a large number of windings, and hence the length of wire necessary, without making the diameter of the rotor too large.

The electric motor of the above indicated type constructed according to the present invention is hereby characterized, that the rotor consists of two or more series of coils and cores arranged adjacent one another upon one or more discs of non-magnetic material arranged to rotate between two sets of stator coils and cores so that the rotor cores are magnetically intermediate and complementary to the stator cores in the magnetic circuit.

Hereby with two series of rotor coils the possibility is provided of housing twice the number of coils with the same diameter of rotor, the inner ends of the cores of one series abutting against the inner ends of the cores of the other series, while the outer ends of the cores of each series carry a closed iron ring.

The coils of each series are arranged relatively reversed so that two adjacent coils and cores form an elongated magnet with N. and S. poles. The arrangement is such that one polar ring becomes a north pole and the other ring a south pole.

In motors with only one series of rotor coils the combination of the electromagnetic fluxes is produced by means of a cast iron rotor plate. As the path of the magnetic flux increases with the diameter of the rotor the loss of efficiency also increases with the size of said diameter, so that motors with only one series of coils, in order to remain economical, must have strictly limited dimensions.

A constructional form of the improved motor of the kind above indicated is illustrated as an example in the accompanying drawing, in which Fig. 1 is a sectional view of the motor arranged to stand upon a horizontal base;

It will of course be understood that the motor can operate in any desired position and that the arrangement of the motor upon a horizontal base and with a vertical spindle is only selected for convenience of illustration and description.

Figure 1:
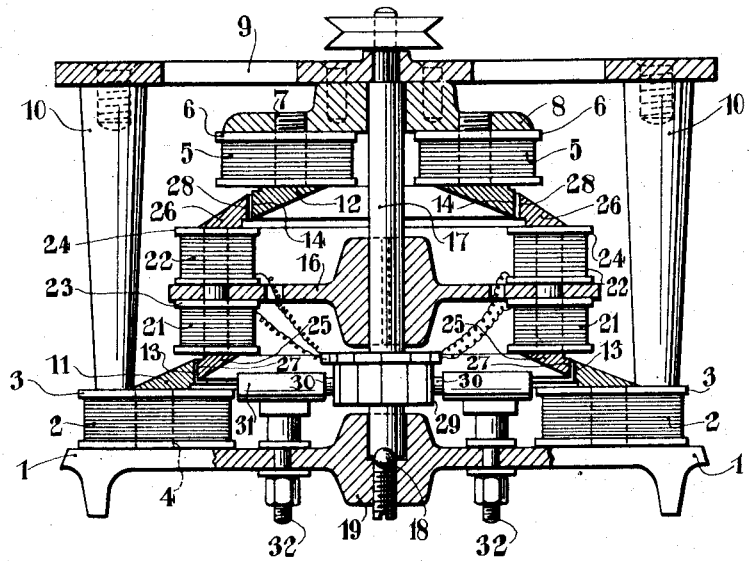
Figure 2:
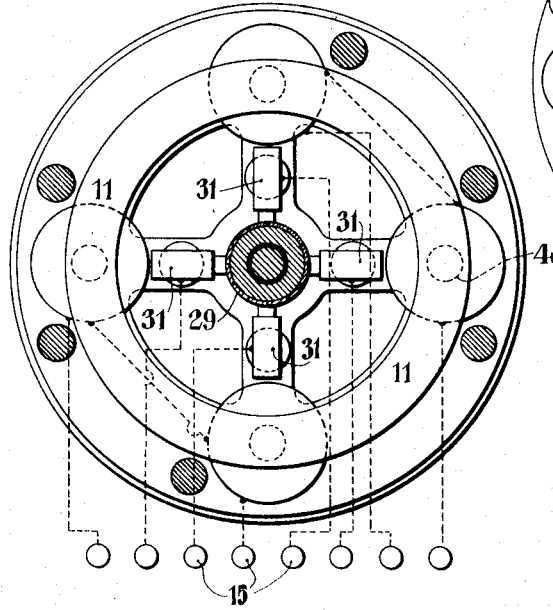
Fig. 2 is a plan of the stator and base plate.
Figure 3:
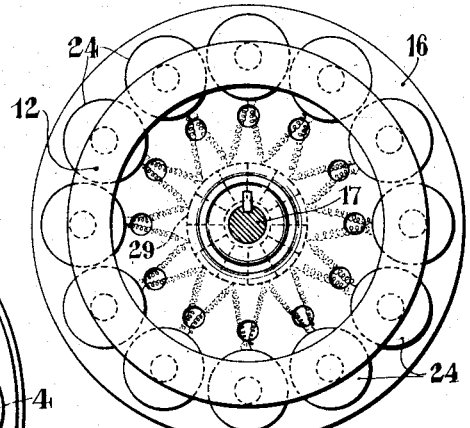
Fig. 3 is a plan of the rotor removed from the stator.

Referring to the drawing, upon a base plate 1, are arranged four separate field coils 2 helically wound upon bobbins 3. The lower ends of the cores 4 of the coils 2 are fixed to the base plate 1 near the periphery of the latter and preferably equidistantly from one another, as shown in Fig. 2.

Four other separate field coils 5 are arranged, in the example illustrated, at the upper part of the motor, and are helically wound upon bobbins 6 and have cores 7 which are secured to the underside of a stationary iron plate 8 which may be supported upon a disc 9 of any suitable non-magnetic material, such as aluminium, the latter being firmly secured to the base plate 1 for instance by means of bolts 10.

The upper ends of the cores 4 of the field coils 2 are interconnected by a closed iron ring 11, and the lower ends of the cores 7 of the upper field coils 5 are similarly interconnected by means of an iron ring 12. The iron stator rings 11 and 12 are preferably of approximately triangular cross section, the ring 11 being provided with a vertical inner surface as shown at 13 and the ring 12 being provided with a vertical outer surface as shown at 14.

The field coils 2 and 5 may be connected in pairs in parallel so as to produce alternately north and south poles or they may be connected in series so as to produce two or four field poles, the desired connections being effected by means of contacts 15 of a governing switch which may be provided with one or more suitable moving elements co-operating with the stationary contacts 15.

The rotor comprises a plate 16 of non-magnetic material, such as aluminium, which is keyed upon a vertical spindle 17 rotatably supported upon a step bearing 18 housed in the central part 19 of the base plate 1. The upper end of the spindle 17 is supported in a bearing carried by the stator plates 8 and 9 and on the upper projecting end of the spindle is secured a pulley 20 which may be connected by a suitable transmission belt to the part to be driven.

One series of rotor coils 21 is secured to the underside of the rotor plate 16, while a second series 22 of rotor coils is secured on the upper side of the said plate, the coils 21 being helically wound on bobbins 23 and the coils 22 being similarly wound upon bobbins 24.

A common core is provided for each pair of adjacent lower and upper rotor coils 21 and 22, and the lower ends of all these rotor cores are interconnected by a closed iron ring 25, and the upper ends of the said rotor cores are interconnected by another closed iron ring 26. The rotor rings 25, 26 are preferably of triangular cross-section and the ring 25 is formed with a vertical surface 27 arranged to rotate in close proximity to the vertical surface 13 of the lower stator ring 11, while the rotor ring 26 is formed with a vertical surface 28 arranged to rotate in close proximity to the vertical surface 14 of the upper stator ring 12.

The rotor coils 21, 22 are connected in the usual manner with a commutator 29 secured upon and insulated from the spindle 17, and a set of four brushes 30 is arranged to press upon the commutator, the said brushes being housed in hollow cylindrical brush-holders 31 secured upon but insulated from the base plate 1, the brush-holders 31 being in electrical connection with terminals 32 to which the supply leads can be connected.

The rotor disc in the improved motor is preferably not of iron but may be of any suitable non-magnetic material, for instance aluminium as described above, as it does not have to combine the electromagnetic fluxes of the power-producing coils owing to this combination of fluxes taking place between the two series of rotor coils.

As the cores of one series abut against those of the other series the path of the magnetic flux in reaching the point of combination is very short and remains independent of the size of the diameter of the rotor. Hereby a greater efficiency is obtained, the magnetic flux has the shortest possible path, and loss through magnetic leakage and length of the iron circuit is excluded.

Another advantage of this construction is the fact that each series of rotor coils can work in each of the magnetic fields independently, or in both jointly, by correspondingly varying the connections of the motor by means of a suitable switch.

The number of series of rotor coils may be increased as desired, using only one collector and one controlling switch and in this manner the horse power may be increased as desired and varied at will by means of any suitable switch.

Thus the possibility is afforded of making the motor run at slow speed with or without load even as a series wound motor, as each magnetic field only exercises its influence over half the rotor, being therefore relatively much stronger than the rotor.

The improved motor can be used with any voltage and any kind of current and at any desired practicable speed with varying power and currents. Owing to the effective use of the magnetic flux produced by the rotor the improved motor has a higher efficiency than any known universal motor. In spite of its multiple series of rotor coils the motor only requires one collector and works with 2 and 4 holes either in series connection, shunt connection, or as a compound-wound motor, and each half of the motor works independently, or both halves jointly.

As a result of its high efficiency the improved motor can be built much smaller than any other universal motor of the same power.

What we claim and desire to secure by Letters Patent is:—

1. In an electric motor, in combination, two stator elements spaced apart each comprising a set of separate coils and cores for the same mounted upon a stationary base of magnetic material and magnetically closed upon itself, a rotor element comprising a plurality of sets of separate coils, cores for said coils mounted upon a non-magnetic member arranged to rotate between the two stator elements, the rotor cores being magnetically interconnected at both ends to constitute a single magnetic circuit, and means for supplying an electric current to the stator and rotor coils.

2. In an electric motor, in combination, a stator element comprising two plates of magnetic material arranged parallel and opposite to, and spaced from, one another, a set of separate coils mounted upon each plate, the coils being wound upon cores fixed to the mutually adjacent sides of the respective plates, each set of cores forming a part of a separate magnetic circuit closed upon itself, a rotor element comprising a plate of non-magnetic material, two sets of separate coils mounted upon the plate, one set on one side and the other set on the other side of the plate, the rotor coils being wound upon cores forming a part of a closed magnetic circuit arranged to rotate between, and to be magnetically interlinked with, the two stator magnetic circuits, and means for supplying an electric current to the stator and rotor coils.

3. In an electric motor, in combination, a stator element comprising two stationary plates of magnetic material arranged opposite and parallel to one another, a set of stator coils and corresponding cores mounted upon one plate, a set of stator coils and corresponding cores mounted upon the second plate, a closed iron ring connecting the inwardly directed ends of one set of the stator cores, another closed iron ring connecting the inwardly directed ends of the other set of the stator cores, a rotor element comprising a plate of non-magnetic material arranged to rotate between said two sets of stator coils and cores, a set of separate coils and cores mounted upon one side of the rotor plate, another set of separate coils and cores mounted upon the other side of said rotor plate, a closed iron ring connecting the outwardly directed ends of one set of rotor cores, a closed iron ring connecting the outwardly directed ends of the other set of rotor cores, the rotor rings being arranged to rotate in close proximity to the adjacent stator rings, and means for supplying an electric current to the stator and rotor coils.

4. In an electric motor, in combination, a stator element comprising two sets of separate coils, cores for each set of stator coils, a plate of magnetic material carrying one set of cores, a second plate of magnetic material arranged opposite and paralled to the first mentioned plate and carrying the second set of stator cores, a closed iron ring connecting the ends of one set of stator cores, a second closed iron ring connecting the ends of the other set of stator cores, a rotor element mounted between the said two sets of stator coils and cores consisting of two sets of separate coils, cores for each set of rotor coils carried by a plate of non-magnetic material, the cores of one set being arranged end to end with the cores of the other set, a closed iron ring connecting one set of rotor cores arranged to rotate in close proximity with one of the stator rings, and another closed iron ring connecting the other set of rotor cores and arranged to rotate in close proximity to the iron ring of the second set of stator cores, and means for supplying an electric current to the stator and rotor coils.

In testimony whereof we affix our signatures.

JONNI ZETSCHE.
NICOLAUS PETERSEN.
J. SINCLAIR-ROSS.